US009215195B2

(12) United States Patent
Zhang

(10) Patent No.: US 9,215,195 B2
(45) Date of Patent: Dec. 15, 2015

(54) METHOD AND APPARATUS FOR MESSAGE SYNCHRONIZATION IN INSTANT MESSAGING APPLICATIONS

(71) Applicant: Tencent Technology (Shenzhen) Company Limited, Shenzhen (CN)

(72) Inventor: Xiaolong Zhang, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 216 days.

(21) Appl. No.: 14/092,781

(22) Filed: Nov. 27, 2013

(65) Prior Publication Data

US 2014/0136638 A1 May 15, 2014

Related U.S. Application Data

(63) Continuation of application No. PCT/CN2013/077354, filed on Jun. 18, 2013.

(30) Foreign Application Priority Data

Nov. 12, 2012 (CN) .......................... 2012 1 0450293

(51) Int. Cl.
*G06F 15/16* (2006.01)
*H04L 12/58* (2006.01)
(52) U.S. Cl.
CPC ..................................... *H04L 51/04* (2013.01)
(58) Field of Classification Search
CPC ....... H04L 51/32; H04L 51/10; H04L 12/585; G06F 13/14; G06F 15/17306; G06F 15/16
USPC ........................... 709/203, 204, 206; 370/352
See application file for complete search history.

(56) References Cited

U.S. PATENT DOCUMENTS

| 7,120,455 | B1 | 10/2006 | Chen et al. | |
|---|---|---|---|---|
| 8,369,311 | B1 * | 2/2013 | Kirchhoff | ......... H04M 3/42263 370/352 |

(Continued)

FOREIGN PATENT DOCUMENTS

| CN | 101198129 A | 6/2008 |
|---|---|---|
| CN | 102130845 A | 7/2011 |
| CN | 102638416 A | 8/2012 |

OTHER PUBLICATIONS

Tencent Technology, ISRWO, PCT/CN2013/077354, Sep. 26, 2013, 7 pgs.

*Primary Examiner* — Tesfay Yohannes
(74) *Attorney, Agent, or Firm* — Morgan, Lewis & Bockius LLP

(57) ABSTRACT

Implementations of the present invention disclose a message synchronizing method and apparatus in an instant messaging application. The method includes detecting a log-in status corresponding to an instant messaging account currently logged-in through an instant messaging application at a first terminal, receiving a request to update an application state of the instant messaging application, determining if the log-in status is a multi-terminal log-in status, where the multi-terminal log-in status indicates that the instant messaging account is simultaneously logged-in from the first terminal and a second terminal. Upon receiving the request to update the application state of the instant messaging application, when that the log-in status is the multi-terminal log-in status, a message synchronization operation is initiated between the first and second terminals. Otherwise, the log-in status is set to indicate that the instant messaging account is logged-in from the first terminal.

15 Claims, 13 Drawing Sheets

(56) References Cited

U.S. PATENT DOCUMENTS

| | | | | |
|---|---|---|---|---|
| 8,443,439 B2* | 5/2013 | Lamastra | H04L 12/585 | 713/188 |
| 2007/0198281 A1* | 8/2007 | Abernethy, Jr. | G06Q 10/109 | 709/204 |
| 2007/0213090 A1* | 9/2007 | Holmberg | G06F 3/04886 | 455/550.1 |
| 2008/0278352 A1* | 11/2008 | Henriksson | G06F 3/0238 | 341/22 |
| 2009/0182832 A1* | 7/2009 | O'Sullivan et al. | G06Q 10/107 | 709/207 |
| 2010/0069035 A1* | 3/2010 | Johnson | H04W 4/02 | 455/404.1 |
| 2011/0202594 A1* | 8/2011 | Ricci | H04M 3/4931 | 709/203 |
| 2013/0067121 A1* | 3/2013 | Beel | G06F 13/14 | 710/20 |
| 2013/0103973 A1* | 4/2013 | Werth | G06F 9/4446 | 714/2 |
| 2014/0025757 A1* | 1/2014 | Haugen | H04L 51/10 | 709/206 |

* cited by examiner

300

700

```
┌─────────────────────────────────────────────────────────────┐
│ Detect a log-in status corresponding to an instant messaging│─702
│ account currently logged-in through an instant messaging    │
│ application at a first terminal                             │
└─────────────────────────────────────────────────────────────┘
                              ↓
┌─────────────────────────────────────────────────────────────┐
│ Receive a request to update an application state of the    │─704
│ instant messaging application                               │
│  ┌───────────────────────────────────────────────────────┐ │
│  │ The request to update the application state includes a│─706
│  │ request to transmit one or more unread message (cf. 722)│
│  └───────────────────────────────────────────────────────┘ │
│  ┌───────────────────────────────────────────────────────┐ │
│  │ The request to update the application state of the    │ │
│  │ instant messaging application is received from a third│─708
│  │ party account distinct from the instant messaging    │ │
│  │ account, and includes one or more unread messages    │ │
│  │ directed to the instant messaging account (cf. 724)  │ │
│  └───────────────────────────────────────────────────────┘ │
│  ┌───────────────────────────────────────────────────────┐ │
│  │ The request is received from a second terminal and    │─710
│  │ includes a request to add or delete an identified    │ │
│  │ conversation received (cf. 726)                      │ │
│  └───────────────────────────────────────────────────────┘ │
│  ┌───────────────────────────────────────────────────────┐ │
│  │ The request to update the application state of the    │─712
│  │ instant messaging application is received from one of│ │
│  │ the first and second terminals (cf. 728)             │ │
│  └───────────────────────────────────────────────────────┘ │
└─────────────────────────────────────────────────────────────┘
                              ↓
┌─────────────────────────────────────────────────────────────┐
│ Determine if the log-in status is a multi-point log-in     │─714
│ status, where the multi-point log-in status indicates that │
│ the instant messaging account is simultaneously logged-in  │
│ from the first terminal and the second terminal            │
│  ┌───────────────────────────────────────────────────────┐ │─716
│  │ Determining that the log-in status is a multi-point   │ │
│  │ log-in status includes detecting previously recorded  │ │
│  │ information identifying the account by the unique    │ │
│  │ account identifier (cf. 736) and identifying the     │ │
│  │ second terminal by a unique terminal identifier      │ │
│  │ corresponding to the second terminal                 │ │
│  └───────────────────────────────────────────────────────┘ │
└─────────────────────────────────────────────────────────────┘
                              ↓
                             (A)
```

FIG. 7A

METHOD AND APPARATUS FOR MESSAGE SYNCHRONIZATION IN INSTANT MESSAGING APPLICATIONS

RELATED APPLICATIONS

This application is a continuation application of PCT Patent Application No. PCT/CN2013/077354, entitled "METHOD AND APPARATUS FOR MESSAGE SYNCHRONIZATION IN INSTANT MESSAGING APPLICATIONS" filed on Jun. 18, 2013, which claims priority to Chinese Patent Application No. 201210450293.4, entitled "MESSAGE SYNCHRONIZING METHOD AND APPARATUS IN INSTANT MESSAGING APPLICATION" filed on Nov. 12, 2012, both of which are incorporated by reference in their entirety.

TECHNICAL FIELD

The disclosed implementations relate generally to the field of data synchronization, and in particular, to a method and apparatus for message synchronization in an instant messaging application.

BACKGROUND

Instant messaging is a type of online chat in which a user can exchange an instant message (which may include text, voice, and multimedia data such as pictures and/or videos) in real-time through an exchange server connected over the Internet to an instant messaging application. Typically, the user will have an account with the exchange service and will have installed the instant messaging application on one or more of his or her devices (e.g., a smart phone, tablet, personal computer or laptop, etc.). After installing the instant messaging application on a computer or a smart mobile terminal, the user will log-on to his or her account and exchange an instant message (IM) with one or more other users through an instant messaging account.

In some circumstances, a user will request that the exchange server perform a particular operation, such as: requesting that a message be sent, updating a user status (e.g., "available," "away," "busy," etc.), updating account preferences and the like. In conventional methods and devices, a problem arises when the user has made such a request after logging into the instant messaging service through multiple terminals (e.g., multiple devices) simultaneously. Typically, the server will perform the operation on the originating terminal, and does not synchronize the operation to other terminals. Such conventional methods require the user to repeatedly execute the same operations on each terminal where the user desires the operation to take effect, and is thus inconvenient and burdensome to the user.

SUMMARY

The implementations described within the present disclosure address the aforementioned problems with conventional methods of instant messaging by providing a method and device which synchronizes a state of instant message application (e.g., on multiple terminals) through which a respective user has logged-in.

In order to solve the technical problems above, the implementations of the present disclosure provide a message synchronizing method in an instant messaging application, which includes, at a server system, detecting a log-in status corresponding to an instant messaging account currently logged-in through an instant messaging application at a first terminal, receiving a request to update an application state of the instant messaging application and determining if the log-in status is a multi-terminal log-in status, where the multi-terminal log-in status indicates that the instant messaging account is simultaneously logged-in from the first terminal and a second terminal. Upon receiving the request to update the application state of the instant messaging application, and in accordance with a determination that the log-in status is the multi-terminal log-in status, the method further includes initiating a message synchronization operation between the first and second terminals. The method further includes setting the log-in status to indicate that the instant messaging account is logged-in from the first terminal.

In some implementations, setting the log-in status to indicate that the instant messaging account is logged-in from the first terminal further includes recording information corresponding to the instant messaging account. In some implementations, the information includes a unique account identifier and a unique terminal identifier corresponding to the first terminal. In some implementations, the information includes an indication that the instant messaging application is either an instant messaging web client or an instant messaging client application installed at the first terminal.

In some implementations, determining that the log-in status is a multi-terminal log-in status further comprises detecting previously recorded information identifying the account by the unique account identifier and identifying the second terminal by a unique terminal identifier corresponding to the second terminal.

In some implementations, the request to update the application state includes a request to transmit one or more unread messages. In such implementations, the method includes, upon receiving the request to update the application state of the instant messaging application, sending the one or more unread messages to a third-party account distinct from the instant messaging account and sending the one or more message to the second terminal.

In some implementations, the request is received from the second terminal and includes a request to add or delete an identified conversation. In such implementations, the method further comprises, upon receiving the request to update the application state of the instant messaging application, generating instructions to add or delete the identified information in accordance with the indication that the instant messaging application is either an instant messaging web client or an instant messaging client application installed at the first terminal and sending the instructions to add or delete the identified conversation to the first terminal.

In some implementations, the request to update the application state of the instant messaging application is received from one of the first and second terminals. In such implementations, the method further includes, prior to initiating the message synchronization operation, sending a synchronization request to the other one of the first and second terminals requesting that the message synchronization operation be performed. Upon receiving a response to the synchronization request from the other one of the first and second terminals and in accordance with the received response indicating that the message synchronization operation is to be performed, the method further includes performing the message synchronization operation. Upon receiving a response to the synchronization request from the other one of the first and second terminals and in accordance with the received response indicating that the message synchronization operation is not to be performed, the method further includes forgoing performing the message synchronization operation.

In accordance with some implementations, a message synchronization apparatus for an instant messaging application includes: a detection module configured to detect a log-in status corresponding to an instant messaging account currently logged-in through an instant messaging application at a first terminal; a receiving module configured to receiving a request to update an application state of the instant messaging application; and a processing module configured to: determine if the log-in status is a multi-terminal log-in status, wherein the multi-terminal log-in status indicates that the instant messaging account is simultaneously logged-in from the first terminal and a second terminal; upon receiving the request to update the application state of the instant messaging application: in accordance with a determination that the log-in status is the multi-terminal log-in status, initiate a message synchronization operation between the first and second terminals; and set the log-in status to indicate that the instant messaging account is logged-in from the first terminal.

In accordance with some implementations, a server system comprises one or more processors; memory; and one or more programs stored in the memory, the one or more programs comprising instructions to: detect a log-in status corresponding to an instant messaging account currently logged-in through an instant messaging application at a first terminal; determine if the log-in status is a multi-terminal log-in status, wherein the multi-terminal log-in status indicates that the instant messaging account is simultaneously logged-in from the first terminal and a second terminal; receive a request to update an application state of the instant messaging application; upon receiving the request to update the application state of the instant messaging application: in accordance with a determination that the log-in status is the multi-terminal log-in status, initiate a message synchronization operation between the first and second terminals; and set the log-in status to indicate that the instant messaging account is logged-in from the first terminal.

The implementations of the present disclosure thereby obviate the need for a user to repeatedly execute the same operations on different login terminals (e.g., a smart phone and a personal computer) by initiating the message synchronization operation when the application state is updated and the login status a multi-terminal login status.

BRIEF DESCRIPTION OF DRAWINGS

FIGS. 7A-7C is a flow chart of a method for message synchronization in instant messaging applications, in accordance with some implementations.

Like reference numerals refer to corresponding parts throughout the several views of the drawings.

DETAILED DESCRIPTION

Figure 1:
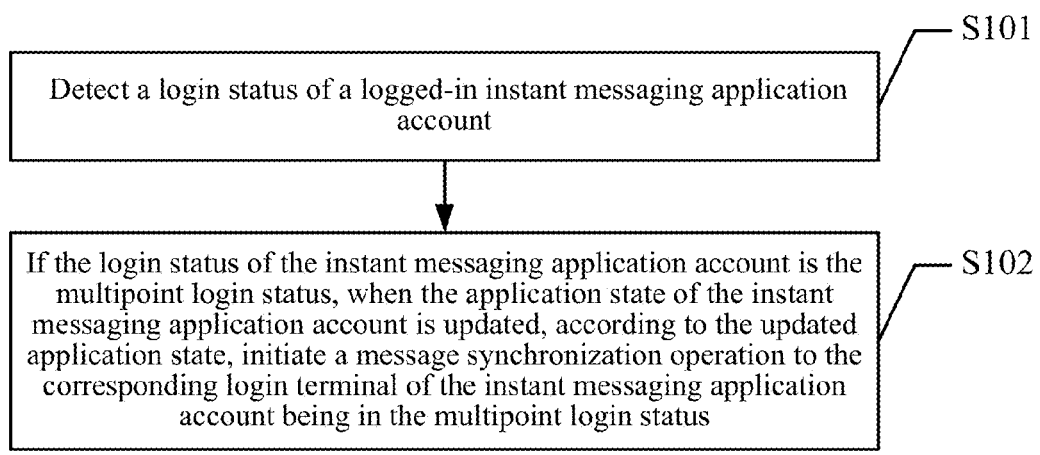
FIG. 1 is a schematic flow chart of a message synchronizing method in an instant messaging application, in accordance with some implementations.

FIG. 1 is a schematic flow chart of a message synchronizing method 100 in an instant messaging application according to some implementations. The message synchronizing method 100 includes the following steps.

S101: Detect a login status of a logged-in instant messaging application account.

In some implementations, the login status of a certain instant messaging application account may be a single-terminal login status or a multipoint login status of logging into two or multiple terminals. Specifically, the login status can be determined through detecting the number of corresponding login identifiers of the instant messaging application account that is recorded in an instant messaging application server. The login identifier is used to identify that the account indicated by account information is logged into at an instant messaging application web client, or identify that the account indicated by the account information is logged into at a client installed with an instant messaging application.

Specifically, before S101, after a user logs into the instant messaging application server through the instant messaging application account, the account information of the logged-in instant messaging application account and a corresponding login identifier thereof may be recorded in the instant messaging application server, so as to determine whether the instant messaging application account is in the multipoint login status according to the account information and the corresponding login identifier thereof when the login status of the instant messaging application account is detected. The login identifier is used to identify that the account indicated by the account information is logged into at the instant messaging application web client, or identify that the account indicated by the account information is logged into at the client installed with the instant messaging application. Through simultaneously implementing the recording of login identifiers of the multiple login terminals in the instant messaging application server, when the updated application state in every terminal is required to be synchronized, an updating operation of the application state can be initiated to every terminal according to the login identifier.

S102: If the login status of the instant messaging application account is the multipoint login status, when the application state of the instant messaging application account is updated, according to the updated application state, initiate a message synchronization operation to the corresponding login terminal of the instant messaging application account being in the multipoint login status.

The login status of the instant messaging application account being in the multipoint login status includes: the instant messaging application account is at least simultaneously logged into at two login terminals, where the login terminal includes the instant messaging application web client and/or the client installed with the instant messaging application.

The application state of the instant messaging application account refers to the application state that may occur in a process of using an instant messaging application by the user, including a quantity on unread messages, an unread message, receiving and sending of a new message in every login terminal, some unread messages being updated to a read state, adding or deleting of contact information, and establishing or deleting of a conversation. When it is found that these application states are changed and updated, a synchronization operation needs to be simultaneously initiated to the multiple terminals at which the instant messaging application account is logged into.

Specifically, if the corresponding application state of the instant messaging application account is updated, that is, the quantity on unread messages and/or an unread message corresponding to the instant messaging application account is updated, the initiating, according to the updated application state, the message synchronization operation to the corresponding login terminal of the instant messaging application account being in the multipoint login status in S102 includes: sending the updated quantity of unread messages and/or the updated unread message corresponding to the instant messaging application account to the corresponding login terminals of the instant messaging application account being in the multipoint login status.

If the corresponding application state of the instant messaging application account is updated, that is, the instant messaging application account receives a new message or sends a new message on a target login terminal, the initiating, according to the updated application state, the message synchronization operation to the corresponding login terminal of the instant messaging application account being in the multipoint login status in S102 includes:

sending the new message received or sent by the target login terminal to the other login terminals when the instant messaging application account is in the multipoint login status.

If the corresponding application state of the instant messaging application account is updated, that is, the message of the instant messaging application account in the target login terminal is updated to the read state, the initiating, according to the updated application state, the message synchronization operation to the corresponding login terminal of the instant messaging application account being in the multipoint login status in S102 includes:

according to the message being updated to the read state in the target login terminal, sending instruction information to the other login terminals when the instant messaging application account is in the multipoint login status, so as to instruct the other login terminals to update the message to the read state.

If the corresponding application state of the instant messaging application account is updated, that is, the contact information of the instant messaging application account in the target login terminal is updated, the initiating, according to the updated application state, the message synchronization operation to the corresponding login terminal of the instant messaging application account being in the multipoint login status in S102 includes:

according to the updated contact information in the target login terminal, sending instruction information to the other login terminals when the instant messaging application account is in the multipoint login status, so as to instruct the other login terminals to update the corresponding contact information.

If the corresponding application state of the instant messaging application account is updated, that is, the conversation of the instant messaging application account in the target login terminal is updated, where the conversation updating includes conversation establishment or deletion, the initiating, according to the updated application state, the message synchronization operation to the corresponding login terminal of the instant messaging application account being in the multipoint login status in S102 includes:

according to the updated conversation in the target login terminal, sending instruction information to the other login terminals when the instant messaging application account is in the multipoint login status, so as to instruct the other login terminals to update the corresponding conversation, which includes establishing or deleting the corresponding conversation.

It will be clear to one of skill in the art that the message synchronization method 100 described above provides the following benefits:

When the login status of the instant messaging application account is the multipoint login status, if the application state is updated, according to the updated application state, the message synchronization operation can be initiated to the corresponding login terminal of the instant messaging application account, so as to prevent the problem in the prior art that since the synchronization cannot be implemented, the user may repeatedly execute same operations in the multiple login terminals, thereby implementing automated and intelligent multi-terminal message synchronization.

Figure 2:
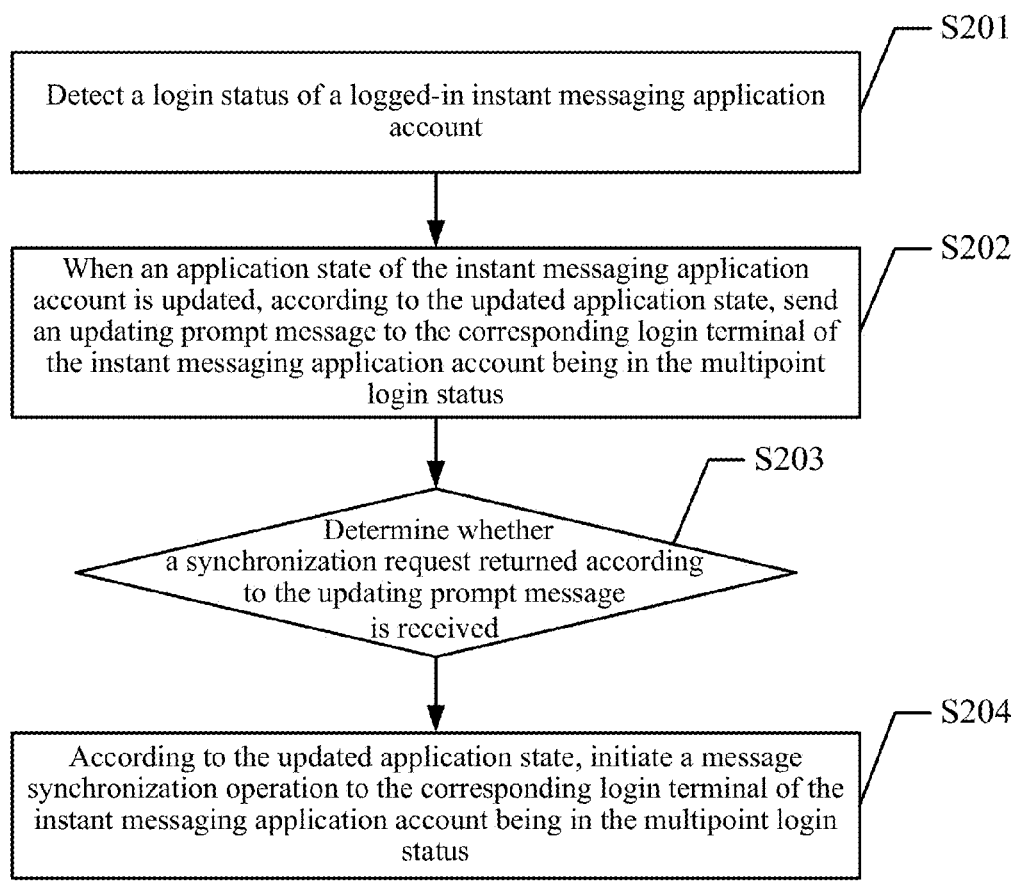
FIG. 2 is a schematic flow chart of a message synchronizing method in an instant messaging application, in accordance with some implementations.

Referring to FIG. 2, FIG. 2 is a schematic flow chart of a message synchronizing method 200 in an instant messaging application according to some implementations. The data synchronizing method 200 includes the following steps.

S201: Detect a login status of a logged-in instant messaging application account.

If the login status of the instant messaging application account is a multipoint login status of simultaneously logging at multiple terminals, execute S202; otherwise, perform instant messaging in accordance with the existing single-terminal operation process. Specifically, a user may simultaneously log into the instant messaging application account at an instant messaging application web client and a client installed with an instant messaging application.

Before S201, the method may further include: recording account information of the logged-in instant messaging application account and a corresponding login identifier thereof, so as to determine whether the instant messaging application account is in a multipoint login status according to the account information and the corresponding login identifier thereof when detecting the login status of the instant messaging application account. The login identifier is used to identify that the account indicated by the account information is logged into at the instant messaging application web client, or identify that the account indicated by the account information is logged into at the client installed with the instant messaging application.

S202: When an application state of the instant messaging application account is updated, according to the updated application state, send an updating prompt message to the corresponding login terminal of the instant messaging application account being in the multipoint login status.

That is to say, in some implementations, when the updating is detected, the updating prompt message is sent first to prompt the corresponding login terminal on the updating, so that the corresponding login terminal actively extracts, through the updating prompt message, the update required by the user.

Specifically, if the application state is updated regarding a quantity on unread messages and/or an unread message, updating prompt information needs to be sent to all the login terminals so as to prompt all the login terminals; if the application state is updated that one of the login terminals receives a new message or sends a new message, a certain message is updated to a read state, contact information is updated, and a conversation is established or deleted, an updating prompt message needs to be sent to all the login terminals except the updated login terminal.

S203: Determine whether a synchronization request returned according to the updating prompt message is received; merely initiate an updating operation to the login terminal that returns the synchronization request, where for updating not required by the user in some login terminals, that is, the login terminals that do not return the synchronization request, the corresponding state is not required to be synchronized.

S204: According to the updated application state, initiate a message synchronization operation to the corresponding login terminal of the instant messaging application account being in the multipoint login status.

The login status of the instant messaging application account being the multipoint login status includes: the instant messaging application account is at least simultaneously logged into at two login terminals, where the login terminal includes the instant messaging application web client and/or the client installed with the instant messaging application.

Specifically, if the corresponding application state of the instant messaging application account is updated, that is, the quantity on unread messages and/or an unread message corresponding to the instant messaging application account is updated, S204 includes: sending the updated quantity on unread messages and/or the updated unread message corresponding to the instant messaging application account to the corresponding login terminal of the instant messaging application account being in the multipoint login status.

If the corresponding application state of the instant messaging application account is updated, that is, the instant messaging application account receives a new message or sends a new message on a target login client, S204 includes: sending the new message received or sent by the target login terminal to the other login terminals when the instant messaging application account is in the multipoint login status.

If the corresponding application state of the instant messaging application account is updated, that is, the message of the instant messaging application account in the target login terminal is updated to a read state, S204 includes: according to the message being updated to the read state in the target login terminal, sending instruction information to the other login terminals when the instant messaging application account is in the multipoint login status, so as to instruct the other login terminals to update the message to the read state.

If the corresponding application state of the instant messaging application account is updated, that is, the contact information of the instant messaging application account in the target login terminal is updated, S204 includes: according to the updated contact information in the target login terminal, sending the instruction information to the other login terminals when the instant messaging application account is in the multipoint login status, so as to instruct the other login terminals to update the corresponding contact information.

If the corresponding application state of the instant messaging application account is updated, that is, the conversation of the instant messaging application account in the target login client is updated, where conversation updating includes conversation establishment or deletion, S204 includes: according to the updated conversation in the target login terminal, sending instruction information to the other login terminals when the instant messaging application account is in the multipoint login status, so as to instruct the other login terminals to update the corresponding conversation, which includes establishing or deleting the corresponding conversation.

It will be clear to one of skill in the art that the message synchronization method 200 described above provides the following benefits:

When the login status of the instant messaging application account is the multipoint login status, if the application state is updated, according to the updated application state, the message synchronization operation can be initiated to the corresponding login terminal of the instant messaging application account, so as to prevent the problem in the prior art that since the synchronization cannot be implemented, the user may repeatedly execute same operations in the multiple login terminals, thereby implementing automated and intelligent multi-terminal message synchronization.

In addition, one piece of prompt information can be sent to the multi-login terminal, and the user determines whether it is required to synchronize a corresponding updating state; for updating not required by the user in some login terminals, the synchronization is not required, so that an unnecessary synchronization operation in the terminal can be avoided, and system resources are conserved, further meeting a synchronization requirement of the user.

A message synchronizing apparatus 300 in an instant messaging application is described in detail below. In some implementations, the message synchronizing apparatus 300 is configured to perform any of the operations described in method 50 and/or method 200 described, respectively, with reference to FIG. 1 and FIG. 2.

Figure 3:
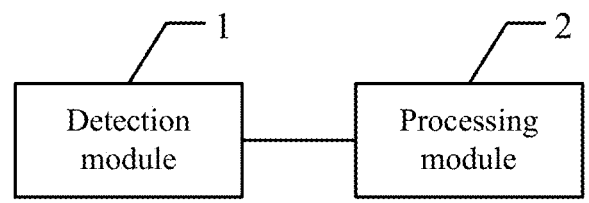
FIG. 3 is a schematic diagram of a message synchronizing apparatus for synchronizing messages in an instant messaging application, in accordance with some implementations.

Referring to FIG. 3, FIG. 3 is a schematic diagram of the message synchronizing apparatus 300 in an instant messaging application according to some implementations. The data synchronizing apparatus 300 may be arranged in an instant messaging application server or may be used as a separate device connected to the instant messaging application server. The data synchronizing apparatus 300 includes a detection module 1 and a processing module 2.

The detection module 1 is configured to detect a login status of a logged-in instant messaging application account.

The processing module 2 is configured to, when a detection result of the detection module 1 is that the instant messaging application account is in a multipoint login status, after an application state corresponding to the instant messaging application account is updated, according to the updated application state, initiate a message synchronization operation to a corresponding login terminal of the instant messaging application account being in the multipoint login status.

The login status of the instant messaging application account being the multipoint login status includes: the instant messaging application account is at least simultaneously logged into at two login terminals, where the login terminal includes an instant messaging application web client and/or a client installed with an instant messaging application.

In some implementations, the login status of a certain instant messaging application account may be a single-terminal login status or the multipoint login status of logging into two or multiple terminals. Specifically, the login status can be determined through detecting the number of corresponding login identifiers of the instant messaging application account that is recorded in the instant messaging application server. The login identifier is used to identify that the account indicated by account information is logged into at an instant messaging application web client, or identify that the account indicated by the account information is logged into at a client installed with the instant messaging application.

The application state of the instant messaging application account refers to the application state that may occur in a process of using an instant messaging application by a user, including a quantity on unread messages, an unread message, receiving and sending of a new message in every login terminal, some unread messages being updated to a read state, adding or deleting of contact information, and establishing or deleting of a conversation. When it is found that these application states are changed and updated, the processing module 2 needs to simultaneously initiate a synchronization operation to the multiple terminals at which the instant messaging application account is logged into.

Further specifically, if the corresponding application state of the instant messaging application account is updated, that is, the quantity on unread messages and/or an unread message corresponding to the instant messaging application account is updated, the processing module 2 is specifically configured to send the updated quantity on unread messages and/or the updated unread message corresponding to the instant messaging application account to the corresponding login terminals of the instant messaging application account being in the multipoint login status.

If the corresponding application state of the instant messaging application account is updated, that is, the instant messaging application account receives a new message or sends a new message on a target login terminal, the processing module 2 is specifically configured to send the new message received or sent by the target login terminal to the other login terminals when the instant messaging application account is in the multipoint login status.

If the corresponding application state of the instant messaging application account is updated, that is, a message of the instant messaging application account in a target login terminal is updated to the read state, the processing module 2 is specifically configured to send, according to the message being updated to the read state in the target login terminal, instruction information to the other login terminals when the instant messaging application account is in the multipoint login status, so as to instruct the other login terminals to update the message to the read state.

If the corresponding application state of the instant messaging application account is updated, that is, the contact information of the instant messaging application account in a target login terminal is updated, the processing module 2 is specifically configured to send, according to the updated contact information in the target login terminal, instruction information to the other login terminals when the instant messaging application account is in the multipoint login status, so as to instruct the other login terminals to update the corresponding contact information.

If the corresponding application state of the instant messaging application account is updated, that is, the conversation of the instant messaging application account in a target login terminal is updated, where conversation updating includes conversation establishment or deletion, the processing module 2 is specifically configured to send, according to the updated conversation in the target login terminal, instruction information to the other login terminals when the instant messaging application account is in the multipoint login status, so as to instruct the other login terminals to update the corresponding conversation, which includes establishing or deleting the corresponding conversation.

It will be clear to one of skill in the art that the message synchronizing apparatus 300 described above provides the following benefits:

When the login status of the instant messaging application account is the multipoint login status, if the application state is updated, according to the updated application state, the message synchronization operation can be initiated to the corresponding login terminal of the instant messaging application account, so as to prevent the problem in the prior art that since the synchronization cannot be implemented, the user may repeatedly execute same operations in the multiple login terminals, thereby implementing automated and intelligent multi-terminal message synchronization.

A message synchronizing apparatus 400 in an instant messaging application is described in detail below. In some implementations, the message synchronizing apparatus 400 is configured to perform any of the operations described in method 50 and/or method 200 described, respectively, with reference to FIG. 1 and FIG. 2.

Figure 4:
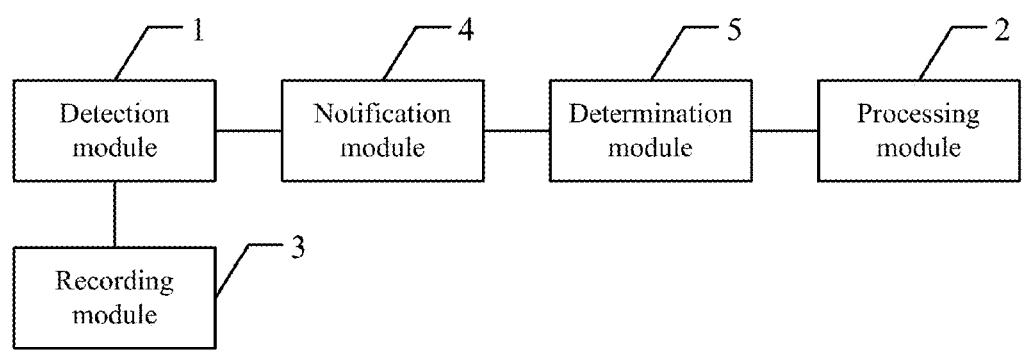
FIG. 4 is a schematic diagram of a message synchronizing apparatus for synchronizing messages in an instant messaging application, in accordance with some implementations.

Referring to FIG. 4, FIG. 4 is a schematic diagram of the message synchronizing apparatus 400 in an instant messaging application according to some implementations. The data synchronizing apparatus may be arranged in an instant messaging application server or may be used as a separate device connected to the instant messaging application server. The data synchronizing apparatus 400 includes a detection module 1 and a processing module 2. Furthermore, the data synchronizing apparatus further includes a recording module 3.

The recording module 3 is configured to record account information of a logged-in instant messaging application account and a corresponding login identifier thereof, so as to determine whether the instant messaging application account is in a multipoint login status according to the account information and the corresponding login identifier thereof when detecting the login status of the instant messaging application account.

The login identifier is used to identify that the account indicated by the account information is logged into at an instant messaging application web client, or identify that the account indicated by the account information is logged into at a client installed with an instant messaging application. Through simultaneously implementing the recording of login identifiers of multiple login terminals in the instant messaging application server, when the updated application state in every terminal is required to be synchronized, an updating operation of the application state can be initiated to every terminal according to the login identifier.

Furthermore, referring to FIG. 4, the data synchronizing apparatus may further include a notification module 4 and a determination module 5.

The notification module 4 is configured to send, according to the updated application state, an updating prompt message to the corresponding login terminal of the instant messaging application account being in the multipoint login status.

The determination module 5 is configured to determine whether a synchronization request returned according to the updating prompt message is received; if yes, trigger the processing module to initiate a message synchronization operation.

That is to say, in some implementations, when the updating is detected, the updating prompt message is sent first by the notification module 4 to prompt the corresponding login terminal on the updating, so that the corresponding login terminal actively extracts, through the updating prompt message, the update required by a users.

Specifically, if the application state is updated regarding a quantity on unread messages and/or an unread message, the notification module 4 needs to send updating prompt information to all the login terminals so as to prompt all the login terminals; if the application state is updated that one of the login terminals receives a new message or sends a new message, a certain message is updated to a read state, contact information is updated, and a conversation is established or deleted, the notification module 4 needs to send the updating prompt message to all the login terminals except the updated login terminal. The determination module 5 determines whether the synchronization request is received, so that it is implemented that the updating is merely initiated to the login terminal that returns the synchronization request, and for updating not required by the user in some login terminals, the synchronization is not required.

It will be clear to one of skill in the art that the message synchronizing apparatus 400 described above provides the following benefits:

When the login status of the instant messaging application account is the multipoint login status, if the application state is updated, according to the updated application state, the message synchronization operation can be initiated to the corresponding login terminal of the instant messaging application account, so as to prevent the problem in the prior art that since the synchronization cannot be implemented, the user may repeatedly execute same operations in the multiple login terminals, thereby implementing automated and intelligent multi-terminal message synchronization.

In addition, one piece of prompt information can be sent to the multi-login terminal, and the user determines whether it is required to synchronize a corresponding updating state; for updating not required by the user in some login terminals, the synchronization is not required, so that an unnecessary synchronization operation in the terminal can be avoided, and system resources are conserved, further meeting a synchronization requirement of the user.

One of ordinary skill in the art should understand that all or a part of the processes of the methods in the implementations may be implemented by a computer program instructing relevant hardware. The program may be stored in a non-transitory computer readable storage medium. When the program runs, the processes of the methods in the implementations are performed. The storage medium may be a magnetic disk, an optical disk, a read-only memory (ROM), or a random access memory (RAM).

Figure 5:
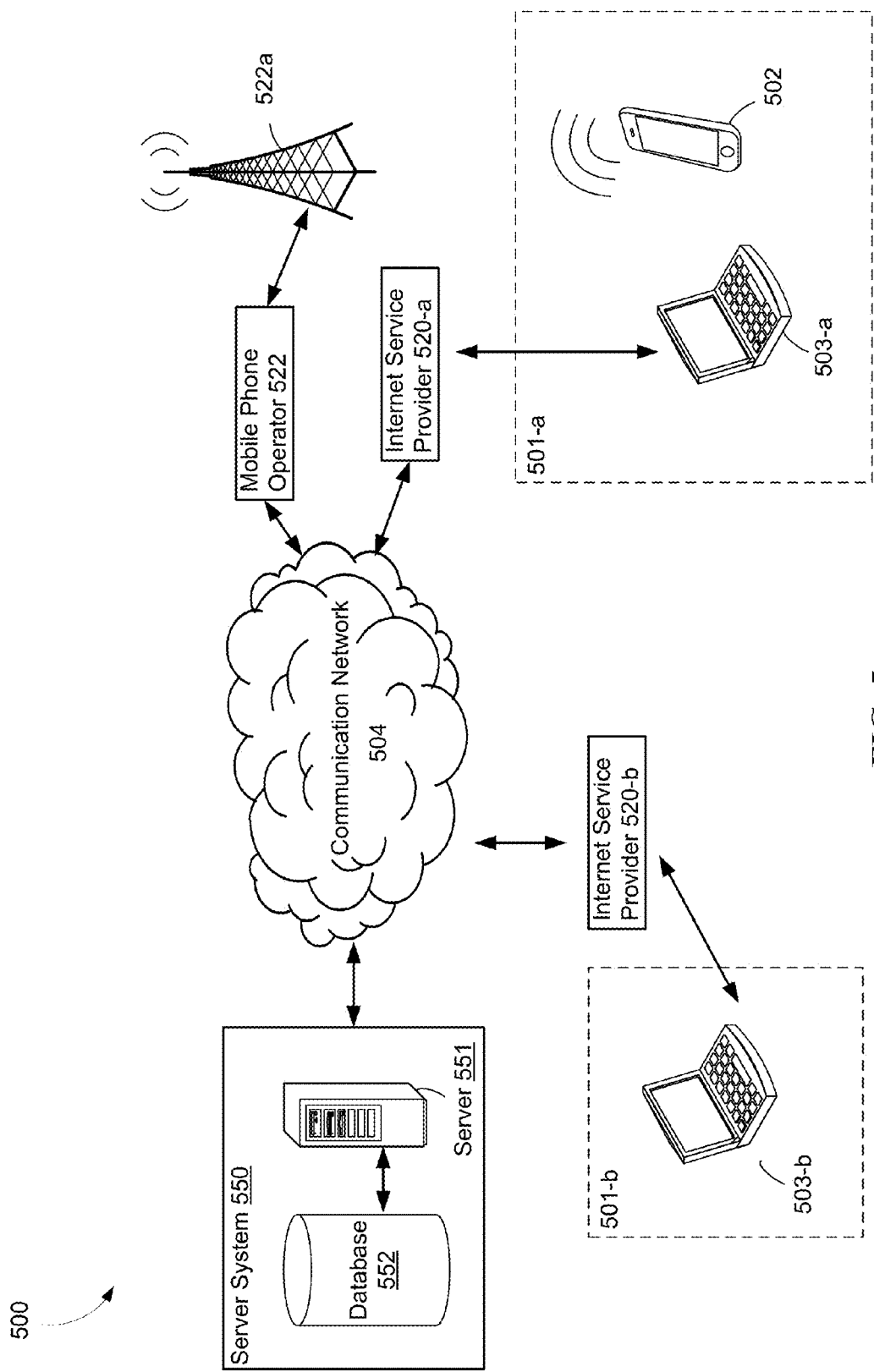
FIG. 5 is a diagram of a client-server environment, in accordance with some implementations.

FIG. 5 is a diagram of a client-server environment 500 in accordance with some implementations. While certain specific features are illustrated, those skilled in the art will appreciate from the present disclosure that various other features have not been illustrated for the sake of brevity and so as not to obscure more pertinent aspects of the implementations disclosed herein. To that end, the client-server environment 500 includes a server system 550, a mobile phone operator 522 (i.e., wireless carrier), one or more internet service providers 520, and a communications network 504. Each of the server system 550, the mobile phone operator 522 (i.e. wireless carrier), and the Internet service providers 520 are capable of being connected to the communication network 504 in order to exchange information (e.g., instant messages, updates to an application state or login status, etc.) with one another and/or other devices and systems. Within the server system 550, there is a server computer 551 for receiving and processing the data received from the client devices 502 and 503. With the server system 550, there is also a database 552 for storing information (e.g., instant messages, updates to an application state or login status, login terminal identifiers, login account identifiers, etc.). Additionally, the mobile phone operator 522 and the Internet service provider 520 are operable to connect client devices to the communication network 504 as well. For example, a smart phone 502 is operable with the network of the mobile phone operator 522, which includes for example, a base station 522a. Similarly, for example, a laptop computer 503-a (or tablet, desktop, workstation or the like) is connectable to the network provided by a first internet service provider 520-a, which is ultimately connectable to the communication network 504. A laptop computer 503-b (or tablet, desktop, workstation or the like), corresponding to a user with a different instant messaging account is connectable to the network provided by a second internet service provider 520-b, which is ultimately connectable to the communication network 504. Moreover, those skilled in the art will appreciate from the present disclosure that any number of such devices and/or systems may be provided in a client-server environment, and particular devices may be altogether absent. In other words, the client-server environment 500 is merely an example provided to discuss more pertinent features of the present disclosure.

The communication network 504 may be any combination of wired and wireless local area network (LAN) and/or wide area network (WAN), such as an intranet, an extranet, including a portion of the Internet. It is sufficient that the communication network 504 provides communication capability between client devices and servers. In some implementations, the communication network 504 uses the HyperText Transport Protocol (HTTP) to transport information using the Transmission Control Protocol/Internet Protocol (TCP/IP). HTTP permits a client device to access various resources available via the communication network 504. However, the various implementations described herein are not limited to the use of any particular protocol.

As discussed below in greater detail with reference to FIG. 8, some client devices, such as the laptop 503 and smart phone 502, include a display and a digital camera. In some implementations, an instant messaging application is operated at least in part by the client device. In operation, the mobile application (e.g., a client application) may interact with the network and one or more hardware elements (e.g., the digital camera) to facilitate the exchange of instant messages. For example, a user using a smart phone 502 may take a picture with a digital camera of the smart phone and send the picture, with accompanying text via communication network 504 as an instant message to a distinct instant message account.

Figure 6A:
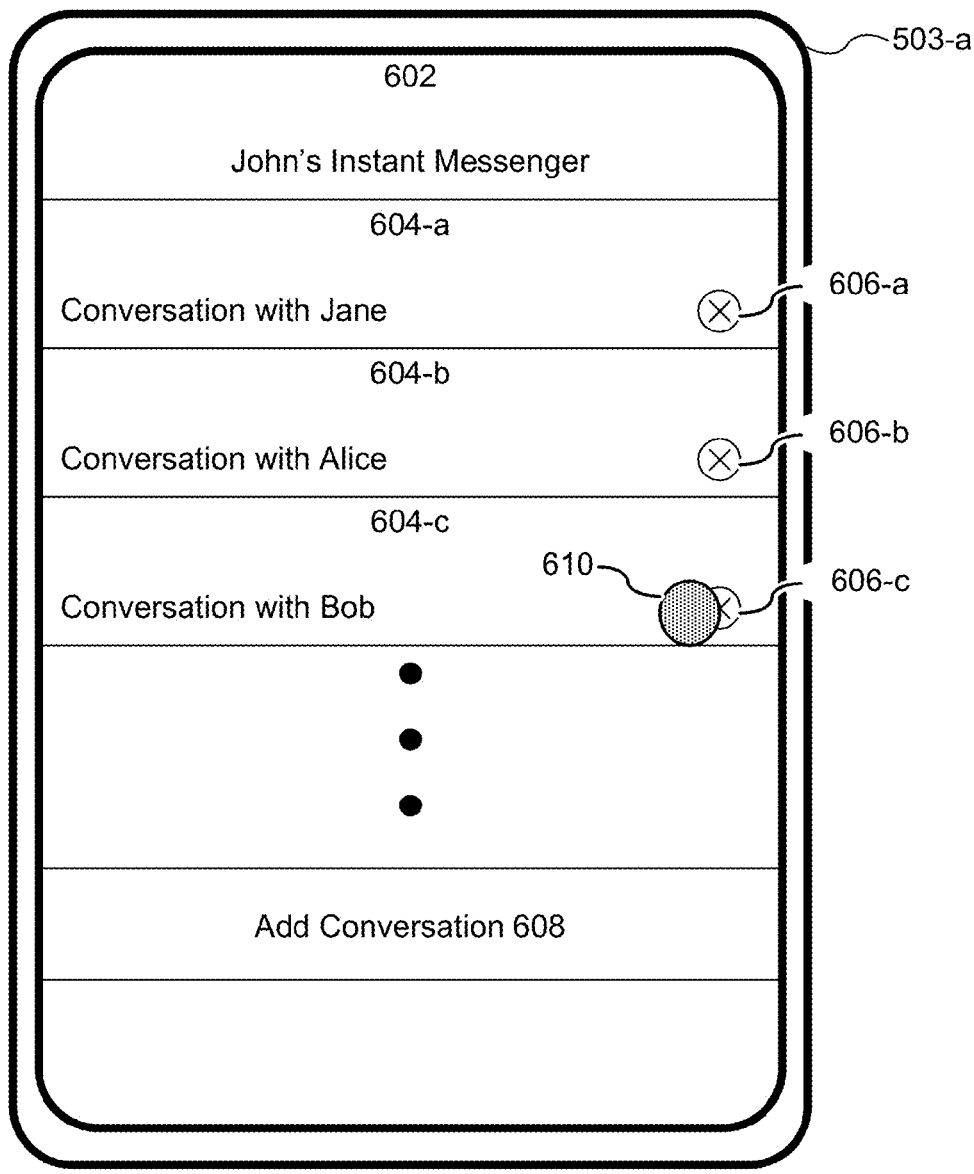
FIGS. 6A-6B are illustrations of exemplary client device user interfaces for message synchronization in an instant messaging application, in accordance with some implementations.

FIG. 6A illustrates an exemplary client device user interface 602 for message synchronization in an instant messaging application, in accordance with some implementations. For ease of explanation, client device user interface 602 is illustrated as an instant messaging application installed on the smart phone client device 503-a. FIG. 6A, together with FIG. 6B, illustrates an example where an instant messaging account is logged-in from distinct remote terminals, as indicated by the fact that instant messaging account (e.g., John's account) is logged-in through both the smart phone client device 503-a (FIG. 6A) and the personal computer 503-a (FIG. 6B).

FIG. 6A includes a list of conversations in a conversation view. In the conversation view, because of space constraints on the display of the smart phone client device 503-a, the user interface 602 displays a list of conversations 604 that a user may choose from, and thereby enter the conversation, whereupon the user will be able to view individual messages (e.g., text, multimedia, etc.) included in the conversation. User interface 602 also includes delete conversation affordance 606, each configured to send a request to a server system to delete a respective conversation 604 from an application state of the instant messaging account. Input 610 (e.g., a touch input on a touch screen display) illustrates that, in this example, the user has opted to delete conversation 604-c, which is a conversation with Bob. User interface 602 also includes, for example, an affordance 608 that allows user to add new conversations to the application state by a similar request to the server system.

Figure 6B:
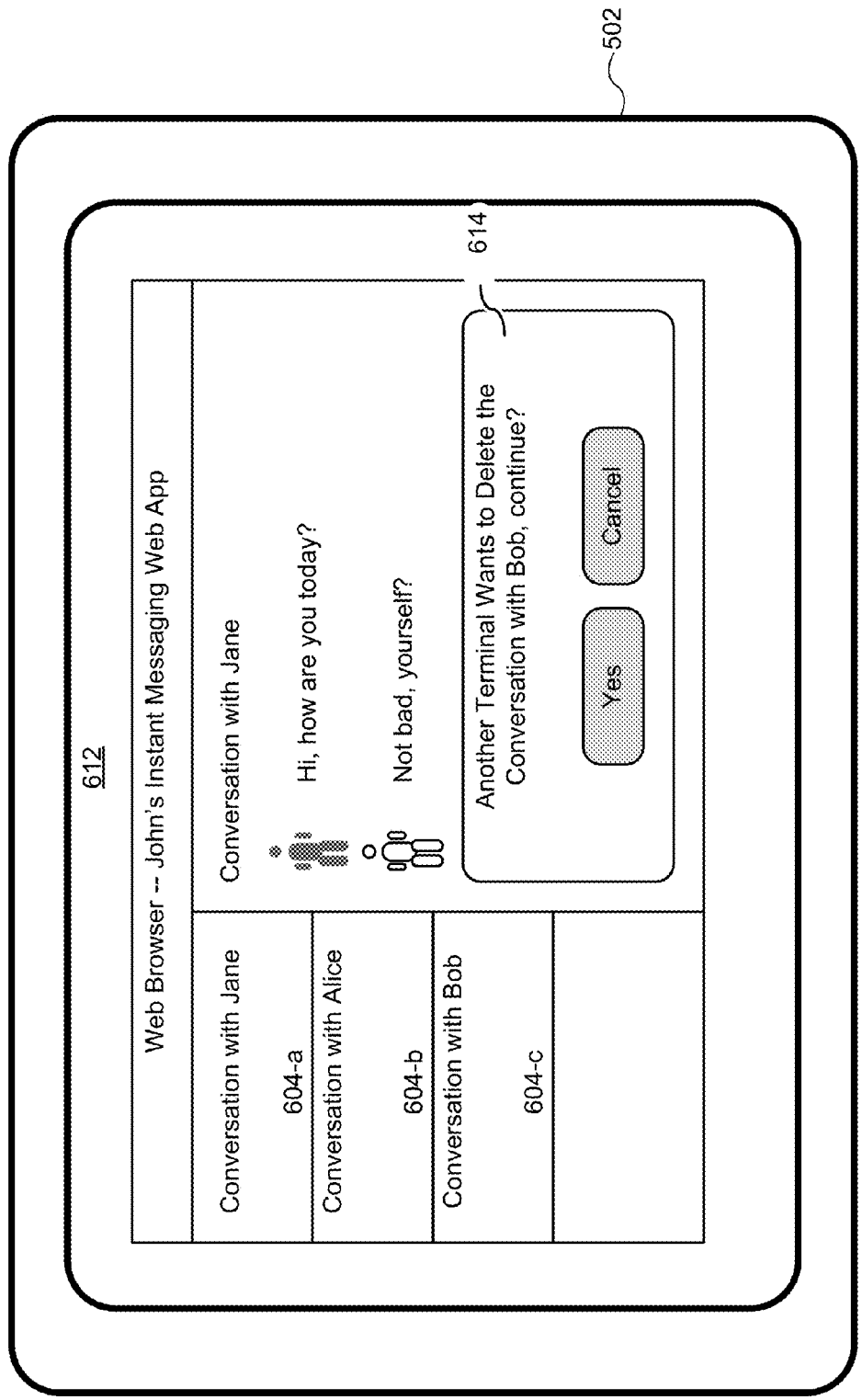

FIG. 6B illustrates the effect of input 610 on a client device user interface 612 running on the client personal computer device 502 (e.g., a second terminal through which the instant messaging account is simultaneously logged in). In this example, user interface 612 is a web client (e.g., the user has logged-on through a web browser, an applet running on a web browser, etc). In response to the input 610 requesting to remove (e.g., delete) conversation 604-*c* from the application state, the user interface 614 displays a window asking if the user would like to delete conversation 604-*c* from user interface 612 as well as 602. In this example, the user interface 612 presents two affordances: a "YES" affordance, which initiates synchronization, and a "CANCEL" affordance, which forgoes the synchronization operation. These exemplary user interfaces therefore allow the system to easily maintain synchronization of active conversation between the two terminals while preventing unwanted data loss through automatic synchronization between devices (e.g., terminals) 502-*a* and 503-*a*.

Figure 7B:
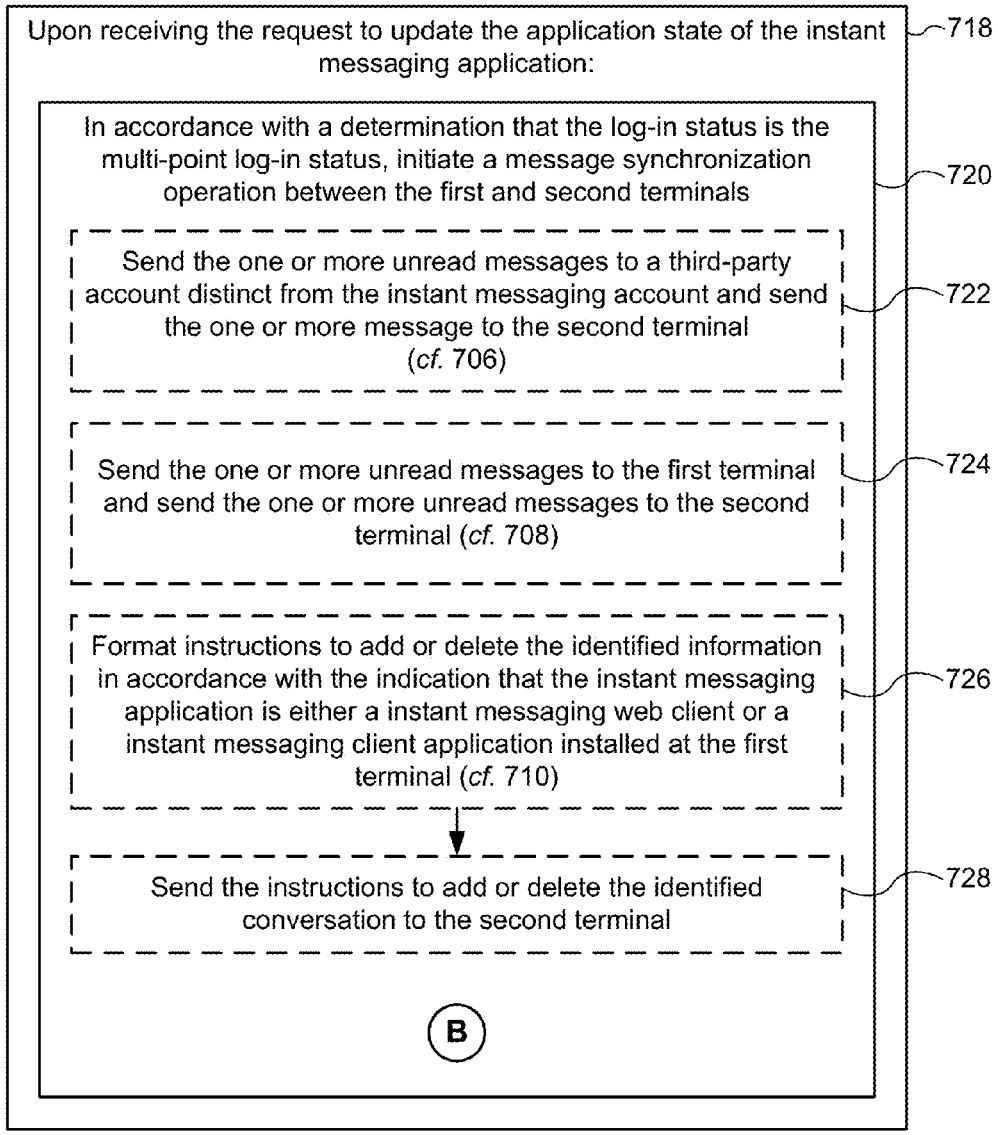
Figure 7C:
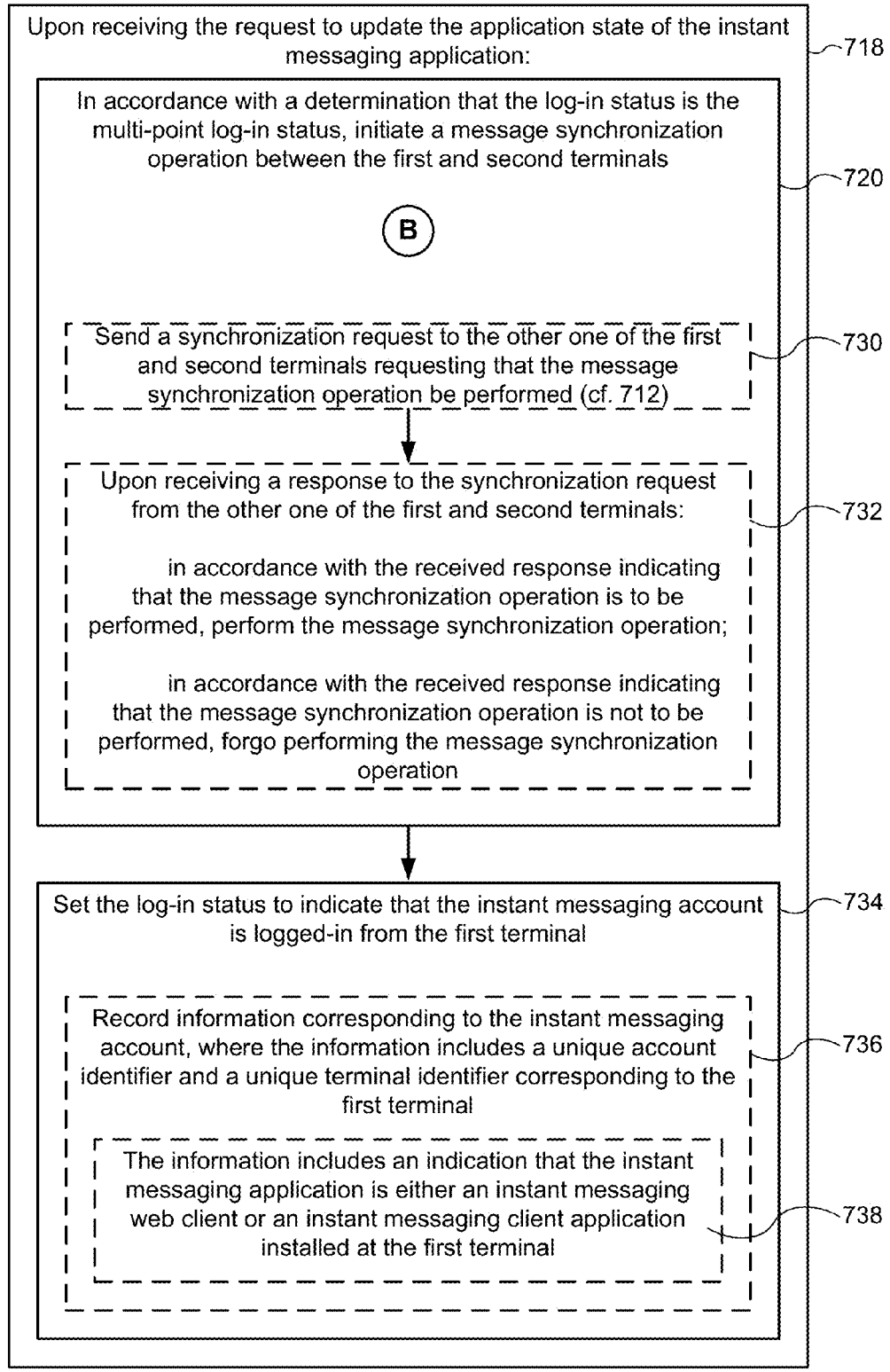

FIG. 7A-7C is a flow chart of a method 700 for message synchronization in instant messaging applications, in accordance with some implementations. In some circumstances, method 700 is performed at server system 550, device 300, or device 400. For ease of explanation, the method 700 is described with reference to implementations on server system 550.

The system detects (702) a log-in status corresponding to an instant messaging account currently logged-in through an instant messaging application at a first terminal (e.g., device 503-*a* running user interface 602, FIG. 6A). For example, the system will detect (e.g., read) part or all of account login information 1000 as described with reference to FIG. 10.

The system receives (705) a request to update an application state of the instant messaging application. In some implementations, the request to update the application state includes (706) a request to transmit one or more unread message (cf. 722 for an example of further operations performed in response to this type of request). In some implementations, the request to update the application state of the instant messaging application is (708) received from a third party account distinct from the instant messaging account, and includes one or more unread messages directed to the instant messaging account (cf. 724 for an example of further operations performed in response to this type of request). In some implementations, the request is (710) received from a second terminal and includes a request to add or delete an identified conversation (cf. 726 for an example of further operations performed in response to this type of request). In some implementations, the request to update the application state of the instant messaging application is (712) received from one of the first and second terminals (cf. 728 for an example of further operations performed in response to this type of request).

The system determines (714) if the log-in status is a multi-terminal log-in status. The multi-terminal log-in status indicates that the instant messaging account is simultaneously logged-in from the first terminal and the second terminal. In some implementations, determining that the log-in status is a multi-terminal log-in status includes (716) detecting previously recorded information identifying the account by a unique account identifier (cf. 736 for an example of recording a unique account identifier in a data structure such as account login info 1000, FIG. 10) and identifying the second terminal by a unique terminal identifier corresponding to the second terminal. For example, the system determines if the account login information 1000 includes two or more Login Identifiers 1010 (FIG. 10) entries corresponding to currently logged terminals, indicating that the user account is simultaneously logged in from two or more distinct terminals. In some other implementations, the operation 714 occurs before the operation 704 or the two operations occur in parallel. In other words, there is not necessarily an inter-dependency relationship between the two operations.

Upon receiving (718) the request to update the application state of the instant messaging application, the system performs (or optionally performs) the following operations 720 through 738.

In accordance with a determination that the log-in status is the multi-terminal log-in status, the system initiates (720) a message synchronization operation between the first and second terminals. In some implementations, the message synchronization operations sends (722) one or more unread messages to a third-party account distinct from the instant messaging account and sends the one or more message to the second terminal (cf. 706 for an example of a request that would result in such an operation). In some implementations, the system sends one or more unread messages to the first terminal and sends the one or more unread messages to the second terminal (cf. 708 for an example of a request that would result in such an operation). In some implementations, the system formats (726) instructions to add or delete identified information in accordance with the indication that the instant messaging application is either a instant messaging web client or a instant messaging client application installed at the first terminal (cf. 710 for an example of a request that would result in such an operation). After formatting the instructions to add or delete the identified information, the system sends (728) the instructions to add or delete the identified conversation to the second terminal. In some implementations, the system sends a synchronization request to the other one of the first and second terminals requesting that the message synchronization operation be performed (cf. 712 for an example of a request that would result in such an operation). After sending the synchronization request and upon receiving a response to the synchronization request from the other one of the first and second terminals, in accordance with the received response indicating that the message synchronization operation is to be performed (732), the system performs the message synchronization operation and in accordance with the received response indicating that the message synchronization operation is not to be performed, the system forgoes performing the message synchronization operation.

The system sets (734) the log-in status to indicate that the instant messaging account is logged-in from the first terminal. In some implementations, during operation 734, the system records (736) information corresponding to the instant messaging account, where the information includes a unique account identifier and a unique terminal identifier corresponding to the first terminal. In some implementations, during operation 734, the information includes (738) an indication that the instant messaging application is either an instant messaging web client or an instant messaging client application installed at the first terminal.

Figure 8:
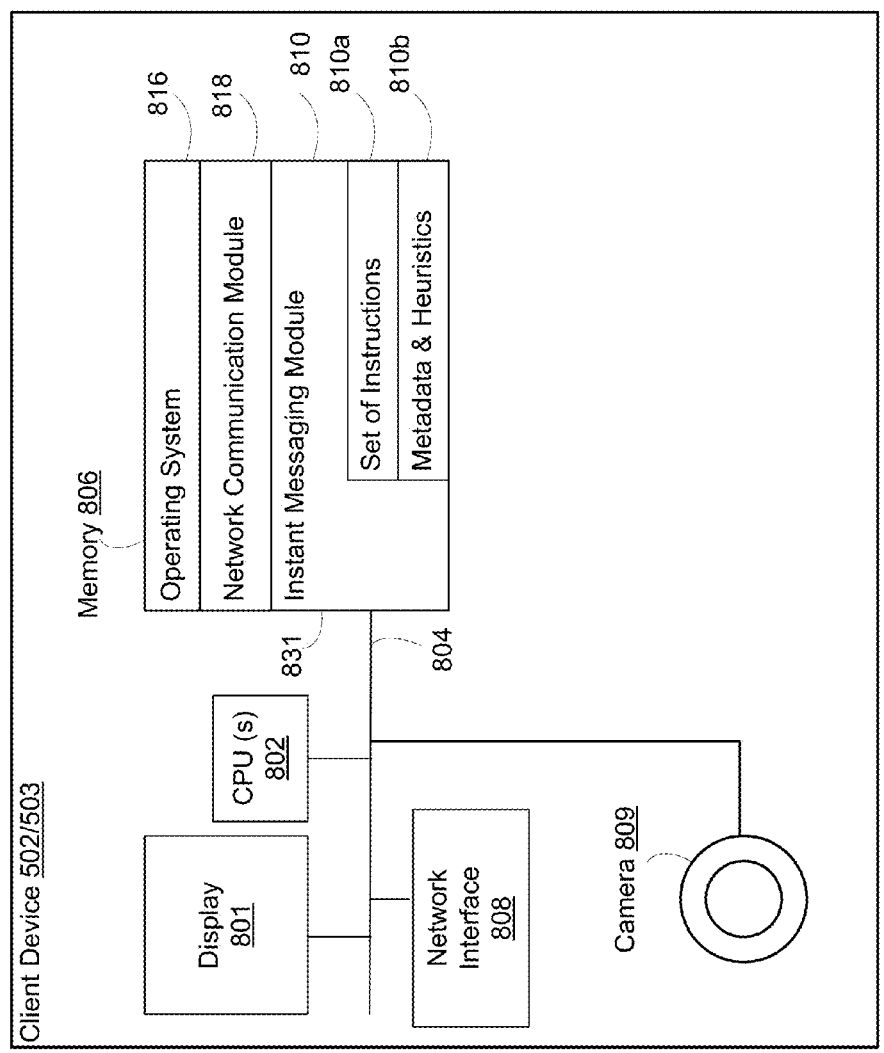
FIG. 8 is a diagram of an example of a client device, in accordance with some implementations.

FIG. 8 is a diagram of an example implementation of a client device 1002/1003 (e.g., laptop 503 and smart phone 502), discussed above with reference to FIG. 5, in accordance with some implementations. While certain specific features are illustrated, those skilled in the art will appreciate from the present disclosure that various other features have not been illustrated for the sake of brevity and so as not to obscure more pertinent aspects of the implementations disclosed herein. To that end, the client device 1002/1003 includes one or more processing units (CPU's) 802, one or more network or other communications interfaces 808, a display 801, memory 806, a digital camera 809, and one or more communication buses for interconnecting these and various other components. The communication buses may include circuitry (sometimes called a chipset) that interconnects and controls communications between system components. The memory 806 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 806 may optionally include one or more storage devices remotely located from the CPU(s) 802. The memory 806, including the non-volatile and volatile memory device(s) within the memory 806, comprises a non-transitory computer readable storage medium.

In some implementations, the memory 806 or the non-transitory computer readable storage medium of the memory 806 stores the following programs, modules and data structures, or a subset thereof including an operating system 816, a network communication module 818, and an instant messaging module 810.

The operating system 816 includes procedures for handling various basic system services and for performing hardware dependent tasks.

The network communication module 818 facilitates communication with other devices via the one or more communication network interfaces 808 (wired or wireless) and one or more communication networks, such as the internet, other wide area networks, local area networks, metropolitan area networks, and so on.

The instant message module 810 is configured to log into an instant messaging account and exchange instant messages over the network. In some implementations, the instant messaging module 810 is an instant messaging application installed on the client device 502/503. In some implementations, the instant messaging module is a set of instructions (e.g., HTTP cookies) that interacts with a web-browser on the client device 502/503 in order to allow the user to log into a instant messaging web client. To that end, the instant messaging module 810 includes a set of instructions 810a and heuristics and metadata 810b (metadata could include, for example, a register indicating whether the user has opted to perform message synchronization).

Figure 9:
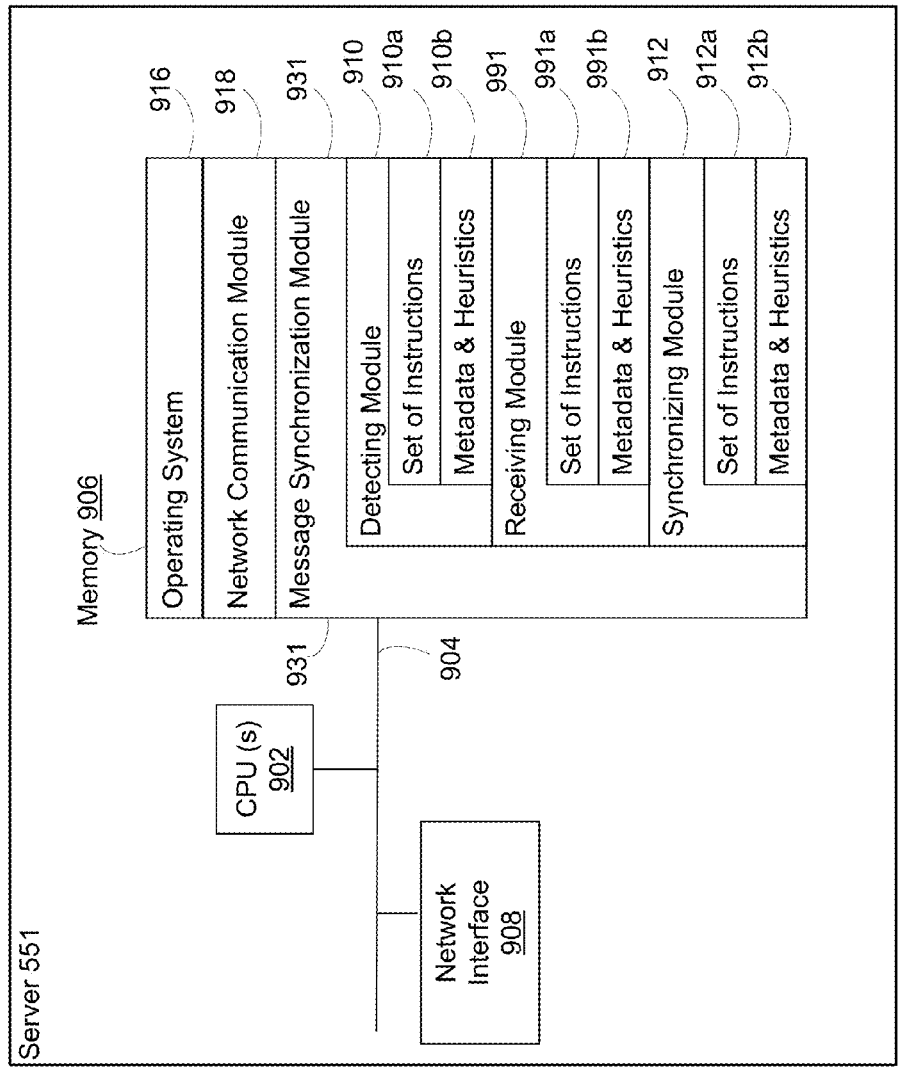
FIG. 9 is a diagram of an example of a server system, in accordance with some implementations.

FIG. 9 is a diagram of an example implementation of a server system 551, discussed above with reference to FIG. 5, in accordance with some implementations. While certain specific features are illustrated, those skilled in the art will appreciate from the present disclosure that various other features have not been illustrated for the sake of brevity and so as not to obscure more pertinent aspects of the implementations disclosed herein. To that end, the server system includes one or more processing units (CPU's) 902, one or more network or other communications interfaces 908, memory 906, and one or more communication buses for interconnecting these and various other components. The communication buses may include circuitry (sometimes called a chipset) that interconnects and controls communications between system components. The memory 906 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 906 may optionally include one or more storage devices remotely located from the CPU(s) 902. The memory 906, including the non-volatile and volatile memory device(s) within the memory 906, comprises a non-transitory computer readable storage medium.

In some implementations, the memory 906 or the non-transitory computer readable storage medium of the memory 906 stores the following programs, modules and data structures, or a subset thereof including an operating system 916, a network communication module 918, and a message synchronization module 931.

The operating system 916 includes procedures for handling various basic system services and for performing hardware dependent tasks.

The network communication module 918 facilitates communication with other devices (e.g., other server systems 551 as well as client devices 502/503) via the one or more communication network interfaces 908 (wired or wireless) and one or more communication networks, such as the internet, other wide area networks, local area networks, metropolitan area networks, and so on.

The message synchronization module 931 is configured to synchronize an application state of a first terminal through which an instant messaging account is logged-in and a second terminal through which the same instant messaging account is logged-in. In some implementations, the synchronization operation is performed over network 1004. In some implementations, as described with reference to method 700 and FIG. 7, a request for synchronization, and/or a request to update the application state of the instant messaging account originates from one client applications running on the first terminal (e.g., on client device 502/503). To that end, the message synchronization operation 931 includes a detecting module 910 for detecting a login status of an instant messaging account, a receiving module 991 for receiving a request to update an application state of the instant messaging account, and synchronizing module 912 for initiating a synchronization operation between the first terminal and the second terminal. To that end, the detecting module 910 includes a set of instructions 210A and heuristics and metadata 210B (metadata could include, for example, application log-in info 1000, FIG. 10). Similarly, the receiving module includes a set of instructions 991a as well as metadata and heuristics 991b, and control module 912 includes a set of instructions 912a and metadata and heuristics 912b.

Figure 10:
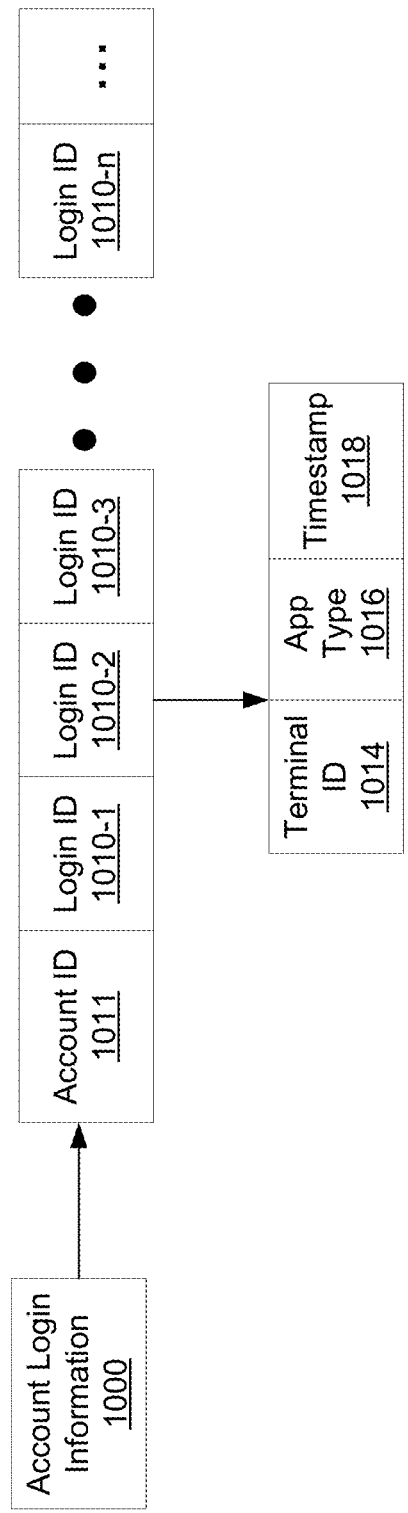
FIG. 10 illustrates a data structure for account login information 1000 in accordance with some implementations.

FIG. 10 illustrates a data structure for account login information 1000 in accordance with some implementations. In some implementations, account login information data structure 1000 includes a unique account ID 1011 corresponding to a particular instant messaging account. In some implementations, the account ID 1011 corresponding to a particular account is a hashed user identifier. For example, in some implementations, the user is required to enter his or her email address and password when logging-in. In such circumstances, the users email account is hashed to produce the account ID. In some implementations, the account ID is a universally unique identifier (UUID). Data structure 1000 also includes a login ID 1010 for each session (e.g., each terminal) through which the account is logged in. In some implementations, the log-in ID is itself a data structure. To that end, the login ID includes: a terminal ID 1014 identifying a terminal through which the account is logged in, and an application type 1016 identifying whether the application is a client application installed at the client device, or is, alternatively, a web client, and a timestamp 1018.

In some implementations, using data structure 1000, detection of the multipoint login status is accomplished as follows: the system detects an account login from a first terminal (e.g., device 502/503). The system uses information obtained during the login process to determine the proper account ID 1011. (e.g., by hashing the user's login information) performs a lookup to determine whether any existing login ID's 1010 already exist for the account ID 1011. If one or more login ID's 1010 already exist, the login status is a multi-terminal status and synchronization is performed in accordance with the methods described herein. In any event, the system instantiates a new login ID 1010 for the account login from the first terminal, and stores the terminal ID 1014, application type 1016, and time-stamp accordingly. When the user logs-out of the first terminal, the new login 1010 is removed from the data structure 1000 corresponding to the user's account.

The above disclosures are merely preferred implementations of the present invention, but are not intended to limit the scope of the claims of the present invention. Any equivalent change made according to the claims of the present invention modification still falls within the scope of the present invention.

While particular implementations are described above, it will be understood it is not intended to limit the invention to these particular implementations. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present invention. First ranking criteria and second ranking criteria are both ranking criteria, but they are not the same ranking criteria.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" nor "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A method for message synchronization in instant messaging applications, comprising:
    at a server system having one or more processors and memory storing programs to be executed by the one or more processors:
        detecting a log-in status corresponding to an instant messaging account currently logged-in through an instant messaging application at a first terminal;
        determining if the log-in status is a multi-terminal log-in status, wherein the multi-terminal log-in status indicates that the instant messaging account is simultaneously logged-in from the first terminal and a second terminal, further including detecting previously recorded information identifying the instant messaging account by a unique account identifier and identifying the second terminal by a unique terminal identifier corresponding to the second terminal;
        receiving a request to update an application state of the instant messaging application;
        upon receiving the request to update the application state of the instant messaging application:
            in accordance with a determination that the log-in status is the multi-terminal log-in status, initiating a message synchronization operation between the first and second terminals; and
            setting the log-in status to indicate that the instant messaging account is logged-in from the first terminal, further including: recording information corresponding to the instant messaging account, wherein the information includes the unique account identifier and a unique terminal identifier corresponding to the first terminal.

2. The method of claim 1, wherein the information includes an indication that the instant messaging application is either an instant messaging web client or an instant messaging client application installed at the first terminal.

3. The method of claim 1, wherein the request to update the application state includes a request to transmit one or more unread messages; and the method further comprising:
upon receiving the request to update the application state of the instant messaging application:
sending the one or more unread messages to a third-party account distinct from the instant messaging account and sending the one or more message to the second terminal.

4. The method of claim 1, wherein the request to update the application state of the instant messaging application is received from a third party account distinct from the instant messaging account, and includes one or more unread messages directed to the instant messaging account; and the method further comprising:
upon receiving the request to update the application state of the instant messaging application:
sending the one or more unread messages to the first terminal and sending the one or more unread messages to the second terminal.

5. The method of claim 1, wherein the request is received from the second terminal and includes a request to add or delete an identified conversation; and the method further comprising:
upon receiving the request to update the application state of the instant messaging application:
generating instructions to add or delete the identified information in accordance with the indication that the instant messaging application is either a instant messaging web client or a instant messaging client application installed at the first terminal; and
sending the instructions to add or delete the identified conversation to the first terminal.

6. The method of claim 1, wherein the request to update the application state of the instant messaging application is received from one of the first and second terminals; and the method further comprising:
prior to initiating the message synchronization operation:
sending a synchronization request to the other one of the first and second terminals requesting that the message synchronization operation be performed; and
upon receiving a response to the synchronization request from the other one of the first and second terminals:
in accordance with the received response indicating that the message synchronization operation is to be performed, performing the message synchronization operation;
in accordance with the received response indicating that the message synchronization operation is not to be performed, forgoing performing the message synchronization operation.

7. A message synchronization apparatus for an instant messaging application, comprising:
one or more processors;
memory; and
a plurality of program modules stored in the memory and to be executed by the one or more processors, the plurality of program modules further including:
a detection module configured to detect a log-in status corresponding to an instant messaging account currently logged-in through an instant messaging application at a first terminal;
a receiving module configured to receiving a request to update an application state of the instant messaging application; and
a processing module configured to:
determine if the log-in status is a multi-terminal log-in status, wherein the multi-terminal log-in status indicates that the instant messaging account is simultaneously logged-in from the first terminal and a second terminal, further including detecting previously recorded information identifying the instant messaging account by a unique account identifier and identifying the second terminal by a unique terminal identifier corresponding to the second terminal;
upon receiving the request to update the application state of the instant messaging application:
in accordance with a determination that the log-in status is the multi-terminal log-in status, initiate a message synchronization operation between the first and second terminals; and
set the log-in status to indicate that the instant messaging account is logged-in from the first terminal, further including: recording information corresponding to the instant messaging account, wherein the information includes the unique account identifier and a unique terminal identifier corresponding to the first terminal.

8. The apparatus of claim 7, wherein the information includes an indication that the instant messaging application is either an instant messaging web client or an instant messaging client application installed at the first terminal.

9. The apparatus of claim 7, wherein the request to update the application state includes a request to transmit one or more unread messages; and
the processing module is further configured to, upon the receiving module receiving the request to update the application state of the instant messaging application, send the one or more unread messages to a third-party account distinct from the instant messaging account and send the one or more message to the second terminal.

10. The apparatus of claim 7, wherein the request to update the application state of the instant messaging application is received from a third party account distinct from the instant messaging account, and includes one or more unread messages directed to the instant messaging account; and
the processing unit is further configured, upon the receiving module receiving the request to update the application state of the instant messaging application, send the one or more unread messages to the first terminal and sending the one or more unread messages to the second terminal.

11. The apparatus of claim 7, wherein the request is received from the second terminal and includes a request to add or delete an identified conversation; and
the processing unit is further configured to, upon the receiving unit receiving the request to update the application state of the instant messaging application:
generate instructions to add or delete the identified information in accordance with the indication that the instant messaging application is either a instant messaging web client or a instant messaging client application installed at the first terminal; and
send the instructions to add or delete the identified conversation to the first terminal.

12. The apparatus of claim 7, wherein the request to update the application state of the instant messaging application is received from one of the first and second terminals; and
the processing unit is further configured to, prior to initiating the message synchronization operation:

send a synchronization request to the other one of the first and second terminals requesting that the message synchronization operation be performed;

upon receiving a response to the synchronization request from the other one of the first and second terminals:
- in accordance with the received response indicating that the message synchronization operation is to be performed, perform the message synchronization operation;
- in accordance with the received response indicating that the message synchronization operation is not to be performed, forgo performing the message synchronization operation.

13. A server system comprising:

one or more processors;

memory; and one or more programs stored in the memory, the one or more programs comprising instructions to:
- detect a log-in status corresponding to an instant messaging account currently logged-in through an instant messaging application at a first terminal;
- determine if the log-in status is a multi-terminal log-in status, wherein the multi-terminal log-in status indicates that the instant messaging account is simultaneously logged-in from the first terminal and a second terminal, further including detecting previously recorded information identifying the account by a unique account identifier and identifying the second terminal by a unique terminal identifier corresponding to the second terminal;
- receive a request to update an application state of the instant messaging application;
- upon receiving the request to update the application state of the instant messaging application:
  - in accordance with a determination that the log-in status is the multi-terminal log-in status, initiate a message synchronization operation between the first and second terminals; and
  - set the log-in status to indicate that the instant messaging account is logged-in from the first terminal, further including: recording information corresponding to the instant messaging account, wherein the information includes the unique account identifier and a unique terminal identifier corresponding to the first terminal.

14. The server system of claim 13, wherein the request to update the application state includes a request to transmit one or more unread messages and the instructions further include instructions for:

upon receiving the request to update the application state of the instant messaging application:
- sending the one or more unread messages to a third-party account distinct from the instant messaging account and sending the one or more message to the second terminal.

15. The server system of claim 13, wherein the request to update the application state of the instant messaging application is received from a third party account distinct from the instant messaging account, and includes one or more unread messages directed to the instant messaging account and the instructions further include instructions for:

upon receiving the request to update the application state of the instant messaging application:
- sending the one or more unread messages to the first terminal and sending the one or more unread messages to the second terminal.

* * * * *